United States Patent [19]
Gerdes et al.

[11] Patent Number: 6,085,999
[45] Date of Patent: Jul. 11, 2000

[54] CORNER IRRIGATION SYSTEM

[75] Inventors: Jerry D. Gerdes, Omaha; Dale A. Christensen, Arlington, both of Nebr.

[73] Assignee: Valmont Industries, Inc., Valley, Nebr.

[21] Appl. No.: 09/194,000

[22] Filed: Nov. 18, 1998

[51] Int. Cl.[7] .................................................. B05B 3/12
[52] U.S. Cl. .............................. 239/729; 239/66; 239/69; 239/73; 239/739; 239/DIG. 1; 364/142
[58] Field of Search .................................. 239/66, 69, 71, 239/73, 97, 726, 728–733, 743, 744, 739, DIG. 1; 137/119.03, 119.08, 624.2, 624.11, 624.13; 364/142, 145, 146

[56] References Cited

U.S. PATENT DOCUMENTS

| | | | |
|---|---|---|---|
| 3,802,627 | 4/1974 | Seckler et al. | 239/729 |
| 3,902,668 | 9/1975 | Daugherty et al. | 239/177 |
| 4,011,990 | 3/1977 | Meis et al. | 239/729 X |
| 4,161,292 | 7/1979 | Holloway et al. | 239/11 |
| 4,227,648 | 10/1980 | Holloway et al. | 239/11 |
| 4,240,582 | 12/1980 | Anderson et al. | 239/729 X |
| 4,249,698 | 2/1981 | Smith et al. | 239/DIG. 1 X |
| 4,340,183 | 7/1982 | Kegel et al. | 239/729 X |
| 4,569,481 | 2/1986 | Davis et al. | 239/729 X |
| 4,729,514 | 3/1988 | Ostrom et al. | 239/727 |
| 5,435,495 | 7/1995 | Davis | 239/728 |
| 5,678,771 | 10/1997 | Chapman | 239/727 |

*Primary Examiner*—Andres Kashnikow
*Assistant Examiner*—Steven J. Ganey
*Attorney, Agent, or Firm*—Zarley, McKee, Thomte Voorhees & Sease; Dennis L. Thomte

[57] ABSTRACT

An irrigation system is disclosed which includes a center pivot support having an elongated main water boom pivotally connected thereto which extends outwardly therefrom. An elongated extension boom is pivotally connected at its inner end to the outer end of the main boom and is supported by a steerable drive tower. A corner arm sensor is provided for sensing the angle of the extension boom with respect to the main boom. A plurality of first sprinklers are positioned on the extension boom along the length thereof and a plurality of second sprinklers are positioned on the extension boom along the length thereof. The water which is normally allocated to the end gun on the outer end of the extension boom is supplied to the second sprinkler during certain periods of time that the end gun is not activated.

3 Claims, 11 Drawing Sheets

CORNER IRRIGATION SYSTEM

BACKGROUND OF THE INVENTION

1. Field of the Invention

This invention relates to a center pivot irrigation system having the ability to irrigate the corners of the field being irrigated. More particularly, this invention relates to an improved means for controlling the distribution of water from the corner span.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of drive towers. In most conventional center pivot irrigation systems, the outermost drive tower is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,726; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field. Perhaps the most popular method of guiding the extension tower is the buried wire system described in U.S. Pat. No. 3,902,668.

A plurality of spaced-apart sprinklers are provided on the main boom as well as on the extension boom. The sprinklers on the extension boom are not activated until the extension boom moves out into the corners of the field. A difficulty arises in providing uniform water distribution in the corner areas of the field due to the fact that the sprinklers on the extension boom are covering varying areas of the field when the extension boom is beginning to move out into the corner of the field than when the extension boom is fully extended. The same is also true when the extension arm is retracting from its fully extended position.

Heretofore, groups of sprinklers on the extension boom were switched on or off, depending upon the angle the extension boom made with the main boom. This resulted in some overwatering and some underwatering, depending upon the position of the extension boom.

To the best of applicants' knowledge, all previous commercial methods of controlling the sequencing of sprinklers on the corner span (corner arm, extension boom) turned a portion of the total water available on or off depending upon the relative location of the corner span.

SUMMARY OF THE INVENTION

A center pivot irrigation system with a corner span attachment is described herein which includes a center pivot support structure located in the field to be irrigated. An elongated main water boom, having inner and outer ends, is pivoted at its inner end to the center pivot support structure and extends outwardly therefrom. The main water boom is comprised of an elongated main water pipe supported upon a plurality of non-steerable drive towers which propel the main water pipe around the center pivot support structure. An elongated extension boom or corner span, having inner and outer ends, is pivotally connected at its inner end to the outer end of the main boom with the extension boom comprising an elongated extension water pipe supported upon at least one steerable drive tower.

A plurality of spaced-apart sprinklers are provided on the main boom for irrigating the field beneath the main boom. A line of first sprinklers and a line of second sprinklers are provided on the extension boom. An end gun sprinkler is mounted on the outer end of the extension boom. When a portion of the first line of sprinklers or the end gun are not turned on, the percentage of total flow that is allocated to those sprinklers and end gun can be utilized by the second sprinklers on the extension boom to improve water distribution under the corner span. In the area where the corner span starts to move away from the boundary or fence row, the water normally available to the first line of sprinklers or end gun is supplied to the second sprinklers which permits the corner arm to extend at a faster rate than would be possible if the water were not available. Utilizing this water as described allows the corner arm to more accurately irrigate additional acres.

It is therefore a principal object of the invention to provide an improved means for irrigating the corner areas of a field to eliminate overwatering and underwatering.

A further object of the invention is to provide a corner irrigation system which utilizes two water lines on the extension boom with one of the lines being activated at certain times when the end gun sprinkler is not being operated.

Yet another object of the invention is to provide a corner irrigation system which allocates the water normally available to the end gun sprinkler to a second set of sprinklers on the corner arm during certain portions of the time when the end gun sprinkler is not activated.

These and other objects will be apparent to those skilled in the art.

DESCRIPTION OF THE PREFERRED EMBODIMENT

Figure 1:
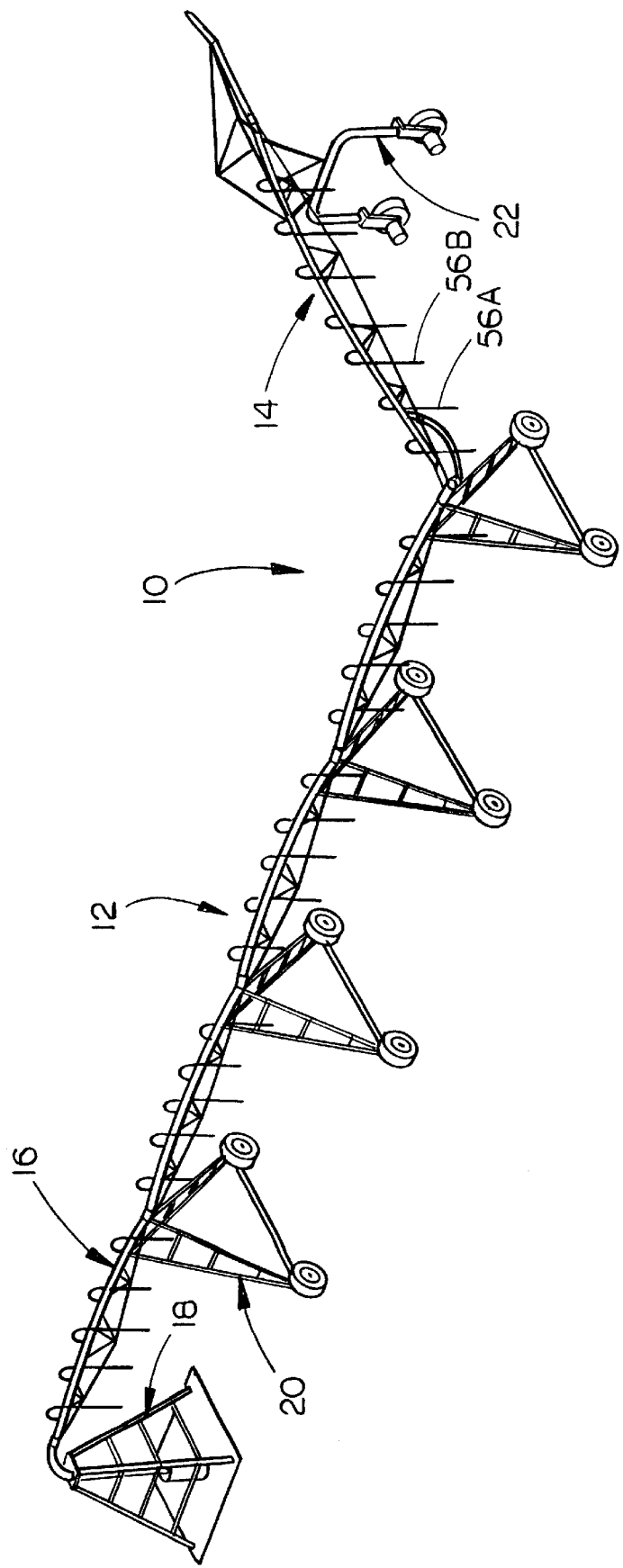
FIG. 1 is a perspective view of a center pivot irrigation system having a corner span pivotally mounted to the outer end thereof.

Referring to FIGS. 1–8, the numeral 10 refers generally to a self-propelled irrigation system which is comprised of a center pivot irrigation system 12 having a corner arm irrigation system or extension boom 14 pivotally connected to the outer end thereof. Generally speaking, center pivot irrigation system 12 is of conventional design and includes a main water conduit or boom 16 which extends outwardly from a conventional center pivot structure 18. Main boom 16 is supported by a plurality of drive towers 20 in conventional fashion. The drive towers 20 are designed to propel the center pivot system around the center pivot structure 18 in conventional fashion. Corner arm, corner span, corner boom or extension boom 14 is supported upon a steerable drive tower 22.

Figure 2:
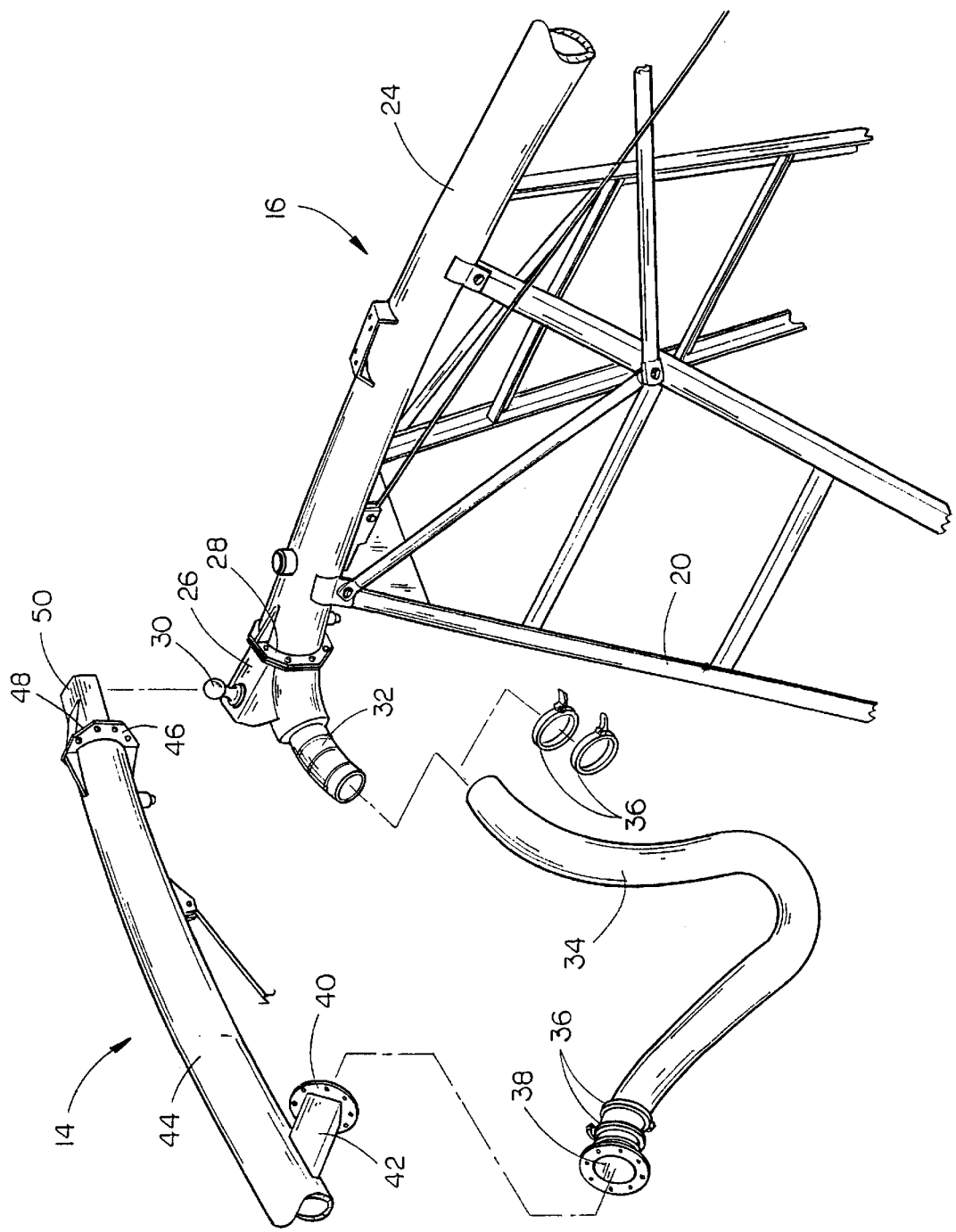
FIG. 2 is an exploded perspective view of the connection between the main boom and extension boom.
Figure 3:
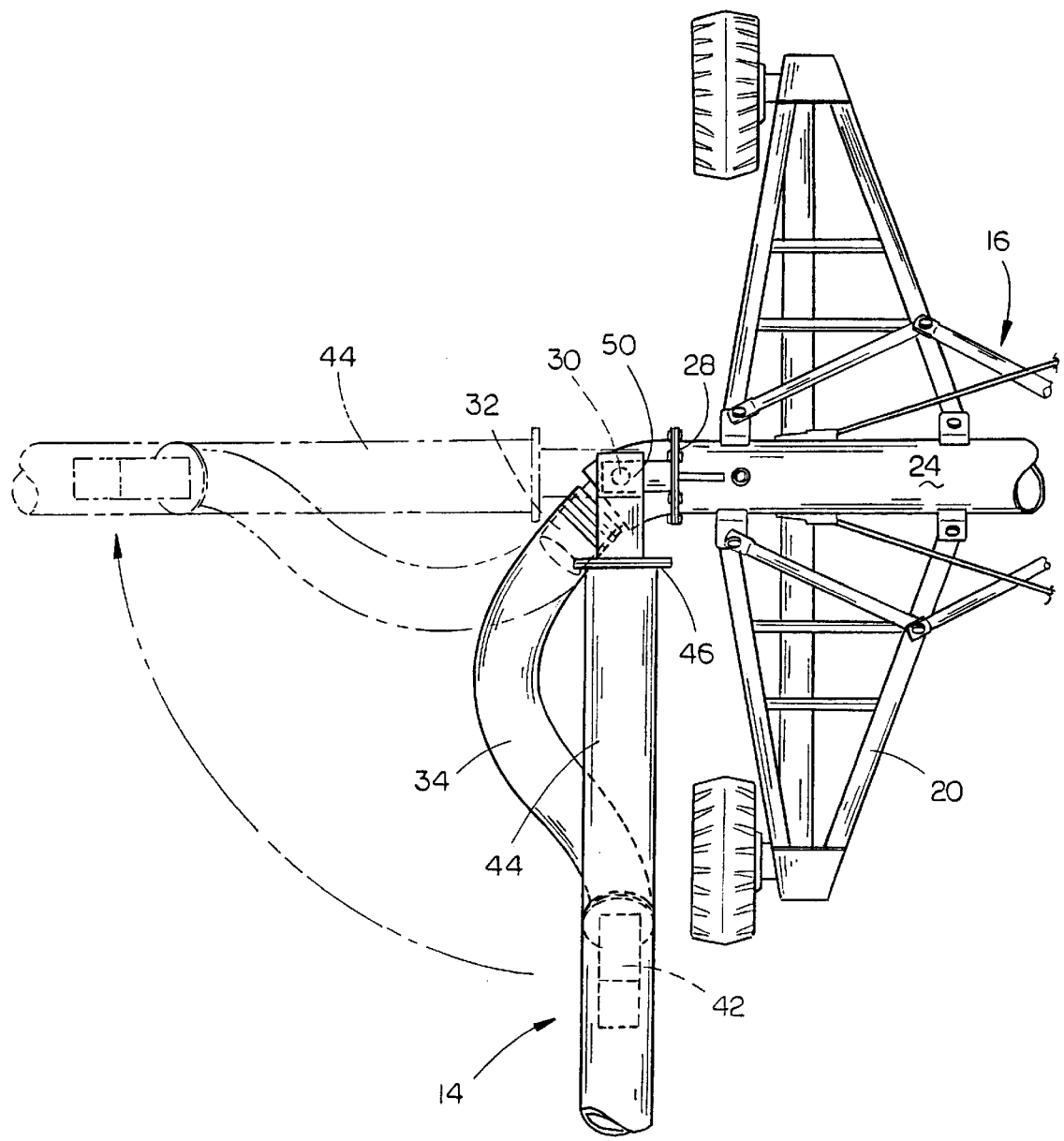
FIG. 3 is a top elevational view of the connection of FIG. 2 with the broken lines illustrating the corner arm water conduit in its completely extended position.
Figure 4:
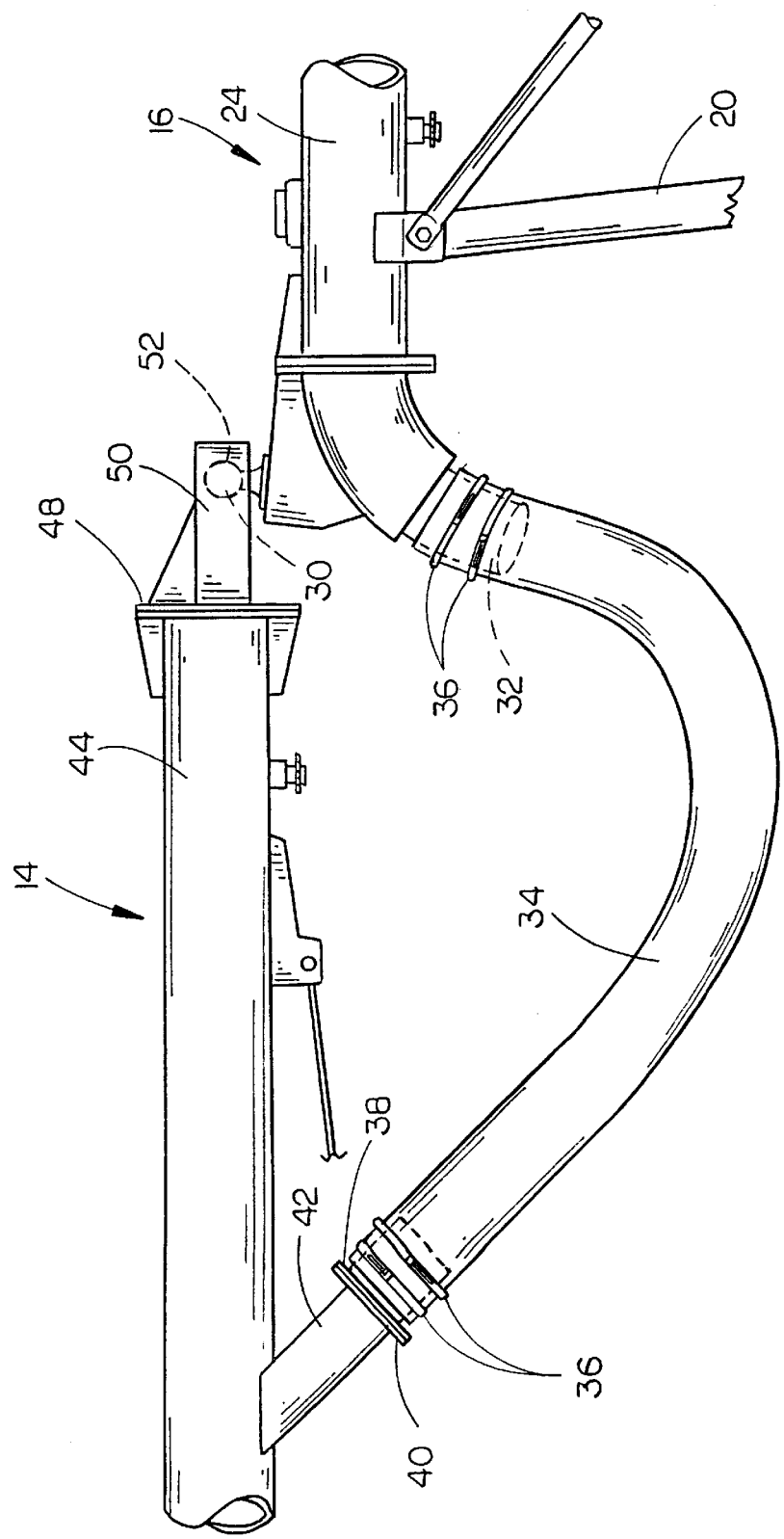
FIG. 4 is a side elevational view of the connection of FIG. 2.

Referring to FIG. 2, the numeral 24 refers to the outermost pipe section of the main boom 16. Support 26 is secured to the annular plate 28 mounted at the outer end of pipe section 24 and has a hitch ball 30 mounted thereon. Support 26 includes an arcuate pipe or elbow section 32 which extends downwardly, outwardly and rearwardly from the pipe section 24, as seen in FIG. 2. One end of connecting hose 34 is mounted on elbow 32 and is maintained thereon by conventional retainers 36. The other end of hose 34 has a flanged pipe 38 secured thereto which is adapted to be secured to the flange 40 which is mounted on the lower inner end of tubular member 42 which extends downwardly from the inner end of the water conduit 44 of corner arm 14. The inner end of water conduit or pipe 44 is provided with an annular flange 46 which is sealed by means of plate 48 having beam 50 extending therefrom. The underside of beam 50 is provided with a ball-shaped pocket 52 which is adapted to receive the hitch ball 30, as illustrated in FIG. 4.

Figure 5:
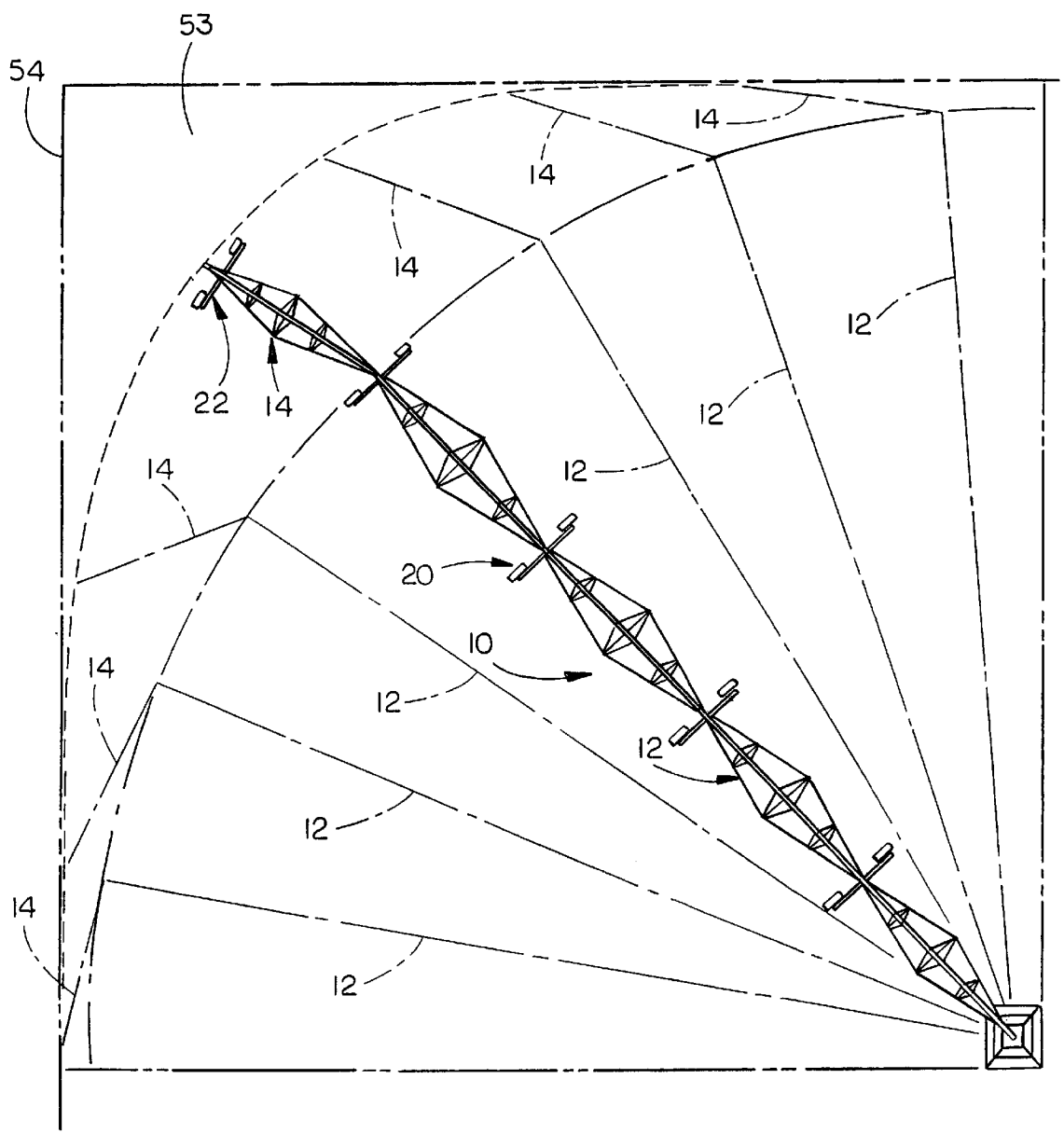
FIG. 5 is a plan view illustrating the corner arm irrigation system of this invention.
Figure 6:
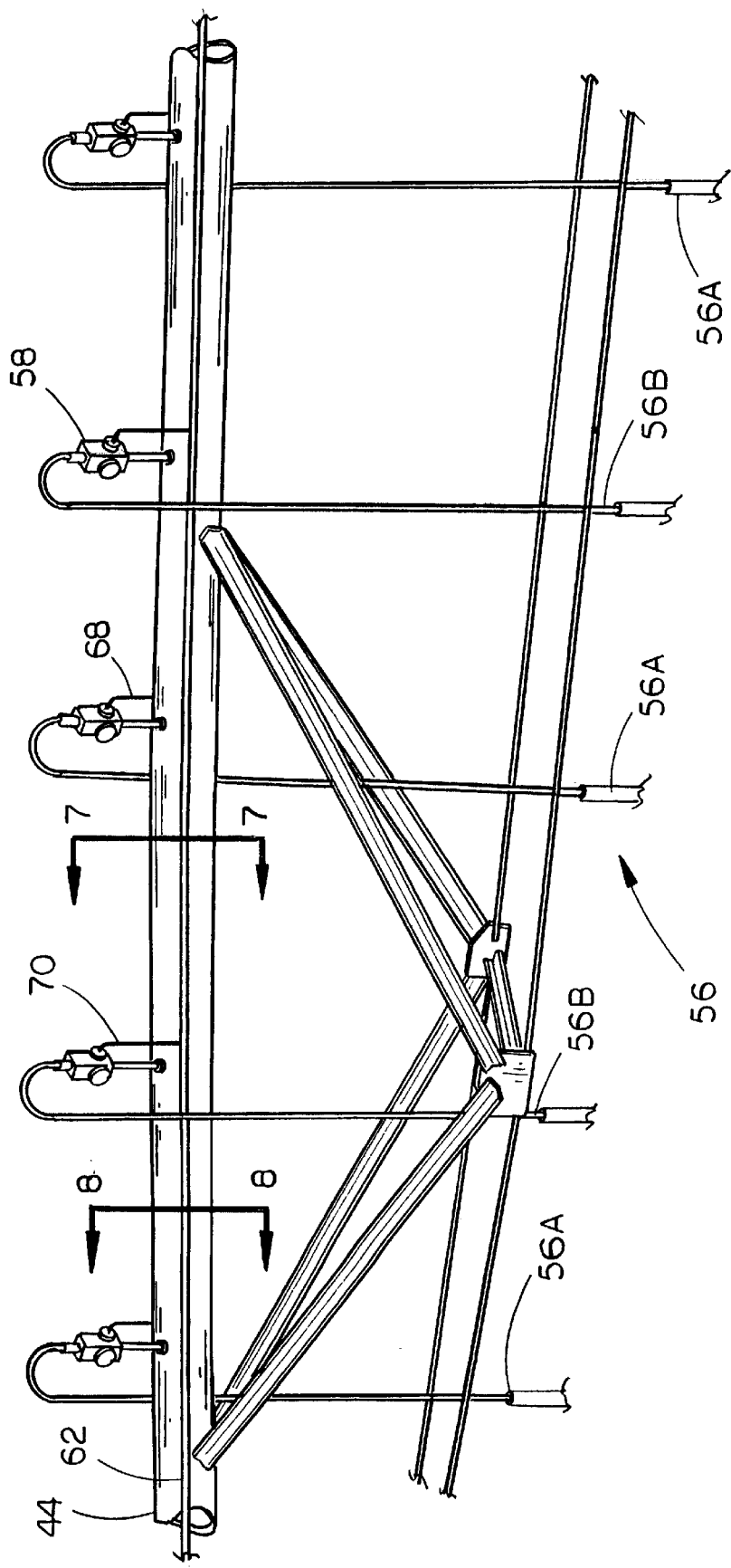
FIG. 6 is a partial perspective view of the extension boom having two sprinkler lines provided thereon.
Figure 8:
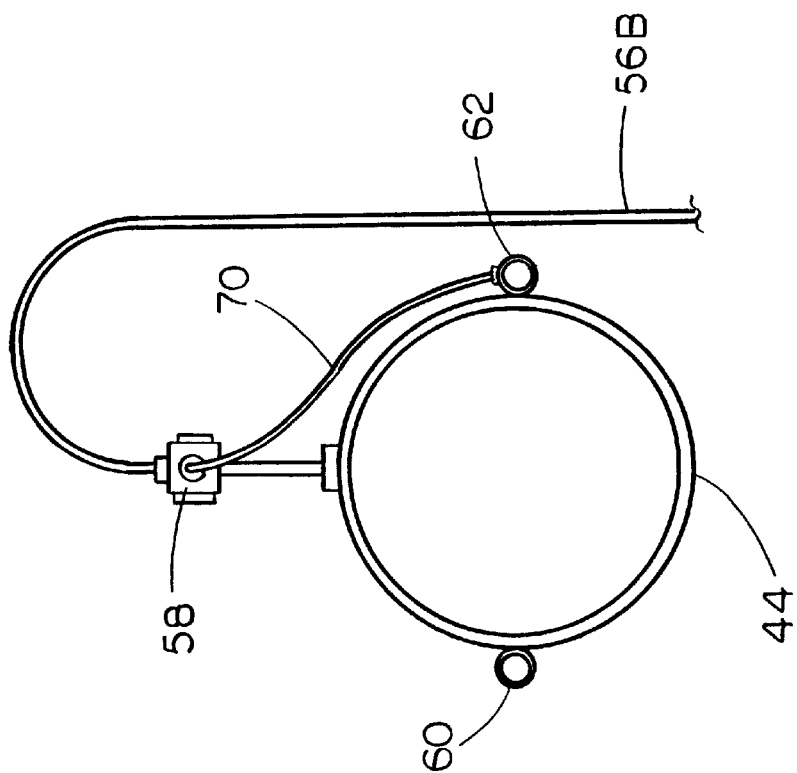
FIG. 8 is a sectional view as seen on lines 8—8 of FIG. 6.
Figure 7:
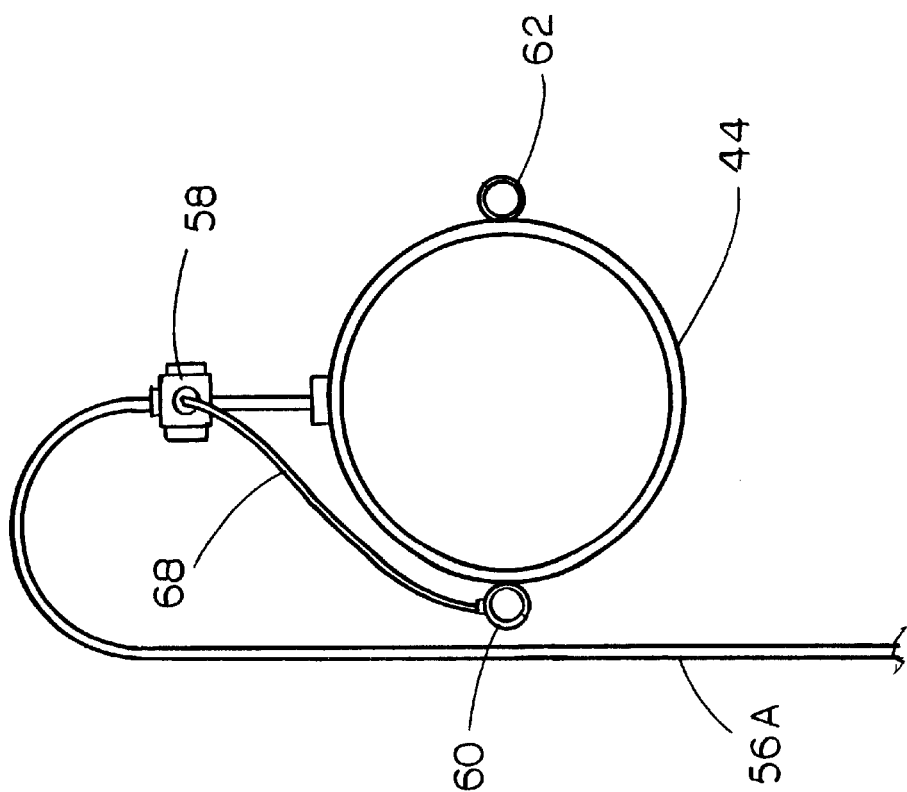
FIG. 7 is a sectional view as seen on lines 7—7 of FIG. 6.

As illustrated in FIG. 5, the corner arm 14 trails the main arm and is moved out into the corners 53 of the field 54 so that the corners of the field may be irrigated in conventional fashion, except for the means of controlling the sprinklers on the corner arm, which will be described in detail hereinafter. Corner arm 14 includes an extension water pipe 44 (FIG. 6), as previously described, which has a plurality of spaced-apart sprinklers 56 positioned thereon. Each of the sprinklers 56 is preferably of the variable rate or pulsed rate type and is individually controlled by means of a combination hydraulic/solenoid valve 58, or similar control, provided thereon.

Figure 9:
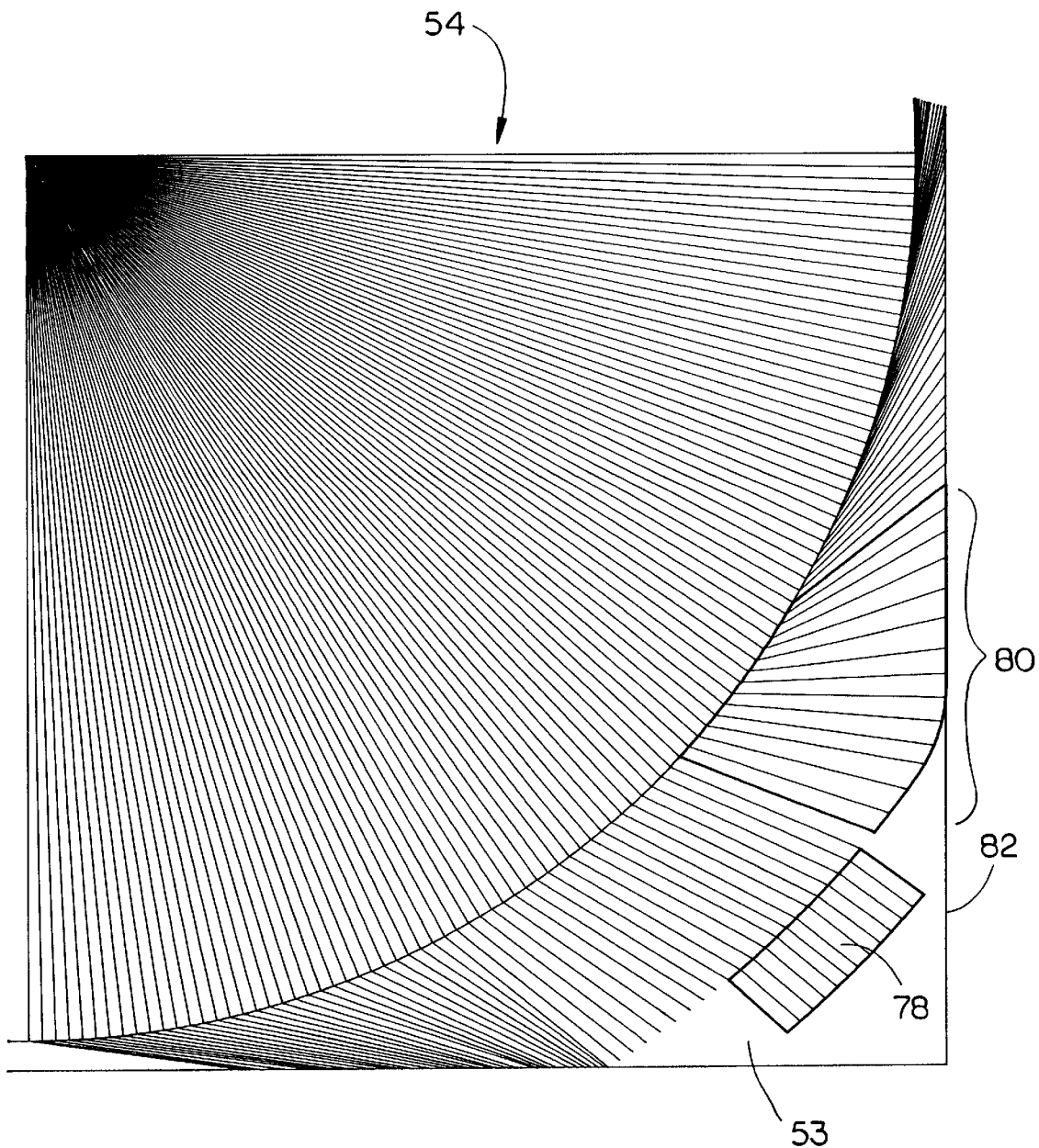
FIG. 9 is a schematic illustrating the areas of a corner wherein the second set of sprinklers are utilized and wherein the end gun sprinkler is utilized.

For purposes of description, the sprinklers 56 will be described as comprising sprinklers 56A and 56B. A first set of hydraulic pilot tubes 60 (FIG. 7) is positioned at one side of pipe 44 and runs the length thereof while a second set of hydraulic pilot tubes 62 (FIG. 8) is positioned at the other side of pipe 44. Hydraulic pilot tubes 68 extend from tube set 60 to the valves 58 on sprinklers 56A while hydraulic pilot tubes 70 extend from tube set 62 to valves 58 on sprinklers 56B. The sprinklers 56A can be commonly or individually controlled and the sprinklers 56B can be commonly or individually controlled. Since the last sprinkler on the end of the corner arm (end gun) normally irrigates 70 to 100 feet beyond the end of the pipeline, as indicated by area 78 on FIG. 9, it cannot be on all the time, since the water would be applied outside the field boundaries where the end of the pipeline is close to a road. When the end gun is not turned on, the percentage of the total flow that is allocated to the end gun is supplied to the second sprinklers 56B for certain periods of time to improve water distribution under the corner arm. In the area 80 where the corner arm is pulling away from the boundary or fence row 82, this water can be utilized to allow the corner arm to extend at a faster rate than would be allowable if the water were not available. Utilizing this water in the way described hereinabove allows the corner arm to accurately irrigate additional acres.

Figure 10:
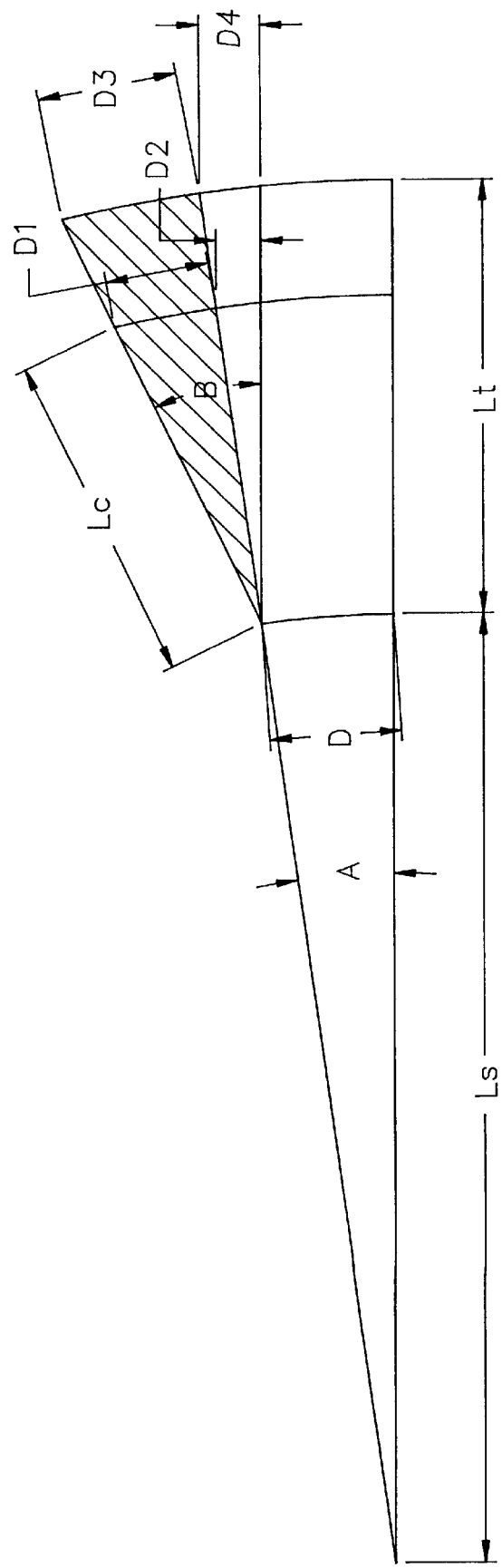
FIGS. 10–12 are diagrams illustrating the manner in which the areas covered by the corner span are calculated.
Figure 11:
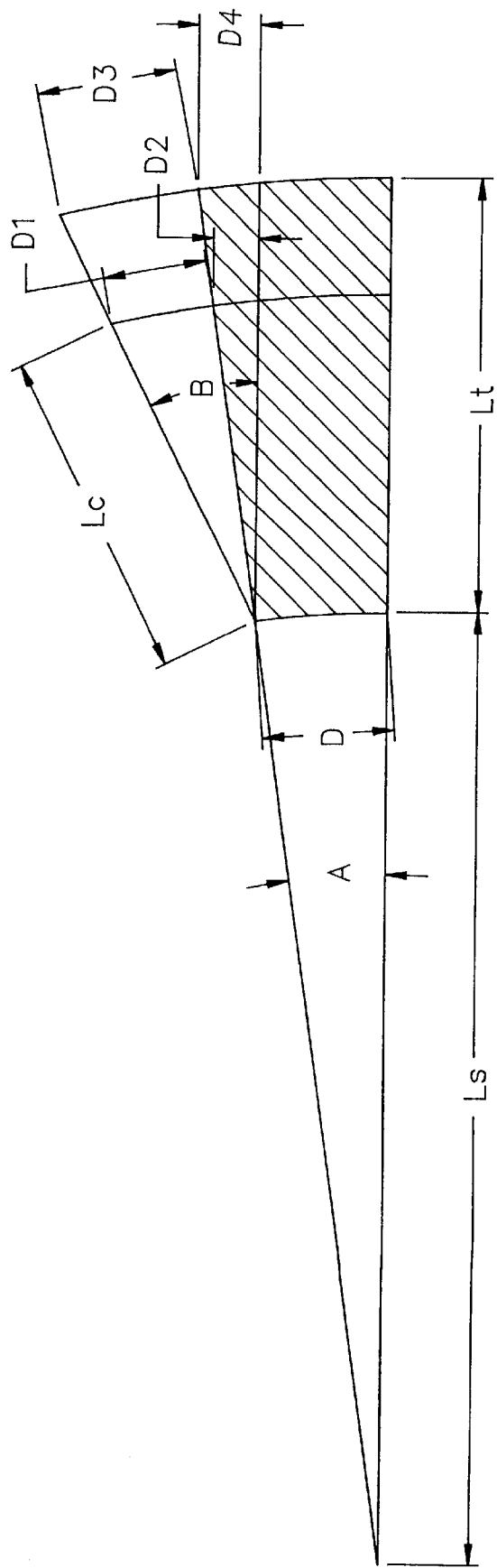
Figure 12:
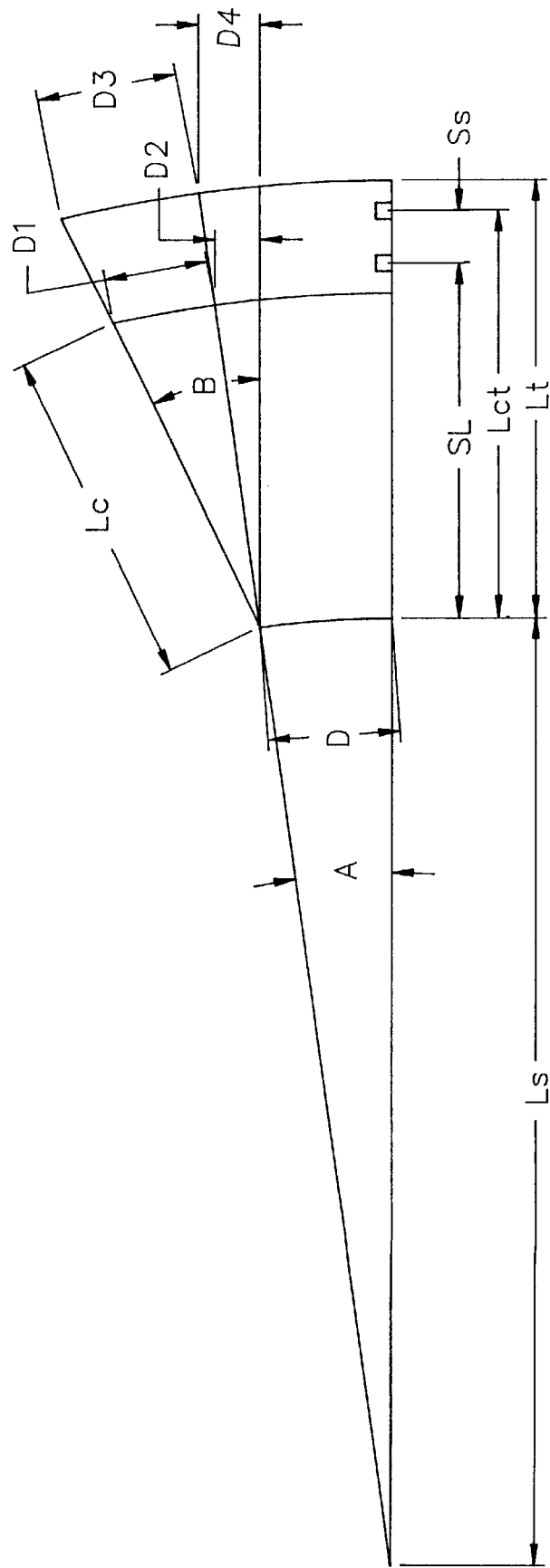

FIGS. 10–12 illustrate the manner in which certain dimensions and angles are determined in order for a computer to calculate the areas being covered by the corner arm as the corner arm moves outwardly from the main boom.

FIG. 11 shows the areas and angles covered by the corner arm just as it reaches full extension. This is the maximum area covered by the corner arm and the area used to size the extension sprinkler package.

Ls=length to the last regular drive unit
Lc=length of the corner to the drive unit
Lt=length of the corner to the end of the overhang
D=distance traveled by the LRDU
A=angle change of the system moving distance d
B=angle change of the corner span
R=speed ratio of the corner to the LRDU
Re=ratio of extension package end area to the normal corner package end area
$GPM_e$=Extension sprinkler gpm
$GPM_s$=Last Standard Sprinkler gpm
Ds=distance from corner joint to extension sprinkler
LSA=Last Sprinkler Area
TIA=Total Irrigated Area
MF=Machine Flow
TF=Total Flow
EF=End Gun Flow
From the drawings of FIGS. 10–12:
A=D/Ls
B=(D1+D2)/Lc
D+D4=A (Ls+Lt)=D/Ls(Ls+Lt)=D(1+Lt/Ls)
D3=Lt(B−A)
D4=L+A
From the speed ratio:
RD=D+D1+D2
Or
D1+D2=D(R−1)
Combining:
B−A=(D1+D2)/Lc−D/Ls
B−A=D(R−1)/Lc−D/Ls
B−A=D[(R−1)/Lc−1/Ls]
Determine the ratio of the extension package distance (D3) to the normal package distance (D+D4):
Re=D3/(D+D4)
Re=Lt D [(R−1)/Lc−1/Ls]/D(1+Lt/Ls)
Re=[(Lt(R−1)/Lc−Lt/Ls)]/(1+Lt/Ls)
Determine the gpm for the Last Standard Sprinkler ($GPM_s$):
LSA=[(Ls+Lt)^2−(Ls+Lt−Ss)^2]π
TIA=[(Ls+Lt)^2]π
MF=TF−EF
GPMs=(LSA/TIA)MF
Determine extension sprinkler gpm ($GPM_e$) at distance $D_s$:
$GPM_e$=($D_s$)(Re)($GPM_s$)/Lt
Thus, utilizing a conventional computer and a conventional angle sensor between the main arm and the corner arm, the areas being covered by the corner arm are calculated to control the operation of the sprinklers 56A and 56B on the corner arm. When the end gun is not turned on (FIG. 9) (area 80), the percentage of total water flow that is allocated to the end gun is utilized by the second set of sprinklers, 56B, on the corner arm to improve water distribution beneath the corner arm. In the area 80, where the corner arm is moving away from the boundary or fence row 82, the water available to the end gun is supplied to the second set of sprinklers, 56B, which permits the corner arm to extend at a faster rate than would be possible if the water were not available. Utilizing this water as described allows the corner arm to more accurately irrigate additional areas.

Thus it can be seen that the invention accomplishes at least all of its stated objectives.

We claim:

1. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon at least one non-steerable drive tower which propels said main water pipe around said center pivot support structure;

said main water pipe having a plurality of spaced-apart sprinklers mounted thereon;

an elongated extension boom, having inner and outer ends, pivotally connected at its said inner end to said outer end of said main boom;

said extension boom comprising an elongated extension water pipe having inner and outer ends supported upon at least one steerable drive tower;

guidance means for controlling said steering means so that said steerable drive tower is moved along a preselected path, as said main boom travels over the field to be irrigated, thereby causing said extension boom to pivotally move with respect to said boom to cause said extension boom to pivotally extend out into corner areas of the field and pivotally retract therefrom as said main boom travels through the field;

a plurality of first sprinklers mounted on said extension water pipe along the length thereof in a spaced-apart relationship;

a plurality of second sprinklers mounted on said extension water pipe along the length thereof in a spaced-apart relationship;

an end gun sprinkler mounted on the outer end of said extension water pipe;

control means for controlling the operation of said first sprinklers;

control means for controlling the operation of said second sprinklers;

means for controlling the operation of said end gun sprinkler;

said means for controlling the operation of said second sprinklers causing said end gun sprinkler to be deactivated when said second sprinklers are being operated;

said means for controlling the operation of said second sprinklers operating said second sprinklers for at least a portion of the time that said end gun sprinkler is not being operated;

said sprinklers being activated, prior to said end gun sprinkler being activated, as said extension boom begins to move outwardly into the corners of the field, thereby allowing said extension boom to extend at a faster rate than would be possible if said second sprinklers were not activated.

2. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon at least one non-steerable drive tower which propels said main water pipe around said center pivot support structure;

said main water pipe having a plurality of spaced-apart sprinklers mounted thereon;

an elongated extension boom, having inner and outer ends, pivotally connected at its said inner end to said outer end of said main boom;

said extension boom comprising an elongated extension water pipe having inner and outer ends supported upon at least one steerable drive tower;

guidance means for controlling said steering means so that said steerable drive tower is moved along a preselected path, as said main boom travels over the field to be irrigated, thereby causing said extension boom to pivotally move with respect to said boom to cause said extension boom to pivotally extend out into corner areas of the field and pivotally retract therefrom as said main boom travels through the field;

a plurality of first sprinklers mounted on said extension water pipe along the length thereof in a spaced-apart relationship;

a plurality of second sprinklers mounted on said extension water pipe along the length thereof in a spaced-apart relationship;

an end gun sprinkler mounted on the outer end of said extension water pipe;

control means for controlling the operation of said first sprinklers;

control means for controlling the operation of said second sprinklers;

means for controlling the operation of said end gun sprinkler;

said means for controlling the operation of said second sprinklers causing said end gun sprinkler to be deactivated when said second sprinklers are being operated;

said means for controlling the operation of said second sprinklers operating said second sprinklers for at least a portion of the time that said end gun sprinkler is not being operated;

said means for controlling the operation of said second sprinklers including means for sensing the angle of said extension boom with respect to said main boom.

3. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon at least one non-steerable drive tower which propels said main water pipe around said center pivot support structure;

said main water pipe having a plurality of spaced-apart sprinklers mounted thereon;

an elongated extension boom, having inner and outer ends, pivotally connected at its said inner end to said outer end of said main boom;

said extension boom comprising an elongated extension water pipe having inner and outer ends supported upon at least one steerable drive tower, guidance means for controlling said steering means so that said steerable drive tower is moved along a preselected path, as said main boom travels over the field to be irrigated, thereby causing said extension boom to pivotally move with respect to said boom to cause said extension boom to pivotally extend out into corner areas of the field and pivotally retract therefrom as said main boom travels through the field;

a plurality of first sprinklers mounted on said extension water pipe along the length thereof in a spaced-apart relationship;

a plurality of second sprinklers mounted on said extension water pipe along the length thereof in a spaced-apart relationship;

an end gun sprinkler mounted on the outer end of said extension water pipe;

control means for controlling the operation of said first sprinklers;

control means for controlling the operation of said second sprinklers;

means for controlling the operation of said end gun sprinkler;

said means for controlling the operation of said second sprinklers causing said end gun sprinkler to be deactivated when said second sprinklers are being operated;

said means for controlling the operation of said second sprinklers operating said second sprinklers for at least a portion of the time that said end gun sprinkler is not being operated;

said means for controlling the operation of said second sprinklers including means for determining the areas being covered by said extension boom as said extension boom moves outwardly from said main boom.

* * * * *